United States Patent
Elboim et al.

(10) Patent No.: US 7,007,115 B2
(45) Date of Patent: Feb. 28, 2006

(54) REMOVING LANE-TO-LANE SKEW

(75) Inventors: Yaron Elboim, Haifa (IL); Amir Wiener, Haifa (IL)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 10/623,209

(22) Filed: Jul. 18, 2003

(65) Prior Publication Data

US 2005/0015522 A1 Jan. 20, 2005

(51) Int. Cl.
*G06F 5/00* (2006.01)
*H04L 7/00* (2006.01)

(52) U.S. Cl. .......................... 710/52; 710/52; 375/372
(58) Field of Classification Search ................ 710/52; 709/204; 375/372

See application file for complete search history.

(56) References Cited

U.S. PATENT DOCUMENTS

| | | | | | |
|---|---|---|---|---|---|
| 4,827,409 | A * | 5/1989 | Dickson | ...................... | 710/52 |
| 6,625,675 | B1 * | 9/2003 | Mann | ......................... | 710/61 |
| 6,654,824 | B1 * | 11/2003 | Vila et al. | ..................... | 710/60 |
| 6,760,803 | B1 * | 7/2004 | Gauvin et al. | ............. | 710/305 |
| 6,892,334 | B1 * | 5/2005 | Slutz et al. | ................. | 714/700 |

* cited by examiner

*Primary Examiner*—Rehana Perveen
*Assistant Examiner*—Christopher Daley
(74) *Attorney, Agent, or Firm*—Trop, Pruner & Hu, P.C.

(57) ABSTRACT

A first serial buffer having a delivering end may deliver first data from a first position. A second serial buffer having a delivering end may deliver second data from a second position. The first position relative to the delivering end of the first serial buffer may be different than the second position relative to the delivering end of the second serial buffer.

26 Claims, 5 Drawing Sheets

REMOVING LANE-TO-LANE SKEW

BACKGROUND

This invention relates generally to buses that provide communication between electronic devices.

The speed at which data may be transmitted may have a significant impact on the performance of a system. Many improvements have recently been made in this field to achieve higher transmission rates. For instance, devices within a system typically transmit data through a shared parallel bus architecture, in which transmission of data by one device may slow down data transmission by other devices. A point-to-point high speed serial switching connection has been proposed as a possible solution to this problem. Such a connection may allow each device to have a dedicated link, without the need to obtain access to a shared bus. Moreover, a dedicated link may include multiple serial lanes, through which data may be transmitted in parallel.

However, while the lanes of the dedicated link typically transmit symbols simultaneously, a difference in the arrival time may occur at the receiver, for example. The arrival time difference is referred to as lane-to-lane skew. Sources of lane-to-lane skew may be chip input/output ("I/O") drivers and receivers, printed wiring boards, electrical and optical cables, serialization and de-serialization logic, and/or retiming repeaters, for example. The lane-to-lane skew may include components that are less or equal to a bit time unit (i.e., the time needed to transmit a single bit) or a part or full symbol time unit (i.e., the time needed to transmit a symbol, generally including multiple bits) of skew. De-skew mechanisms may be implemented to ensure that data passes along in the correct order to higher layers.

While such de-skew mechanisms have worked well to reduce lane-to-lane skew, storing sequences until sequences in all lanes have advanced fully through the respective buffers creates a gap in the continuous data flow. Thus, there is a need for an improved way of reducing lane-to-lane skew.

DETAILED DESCRIPTION

Figure 1:
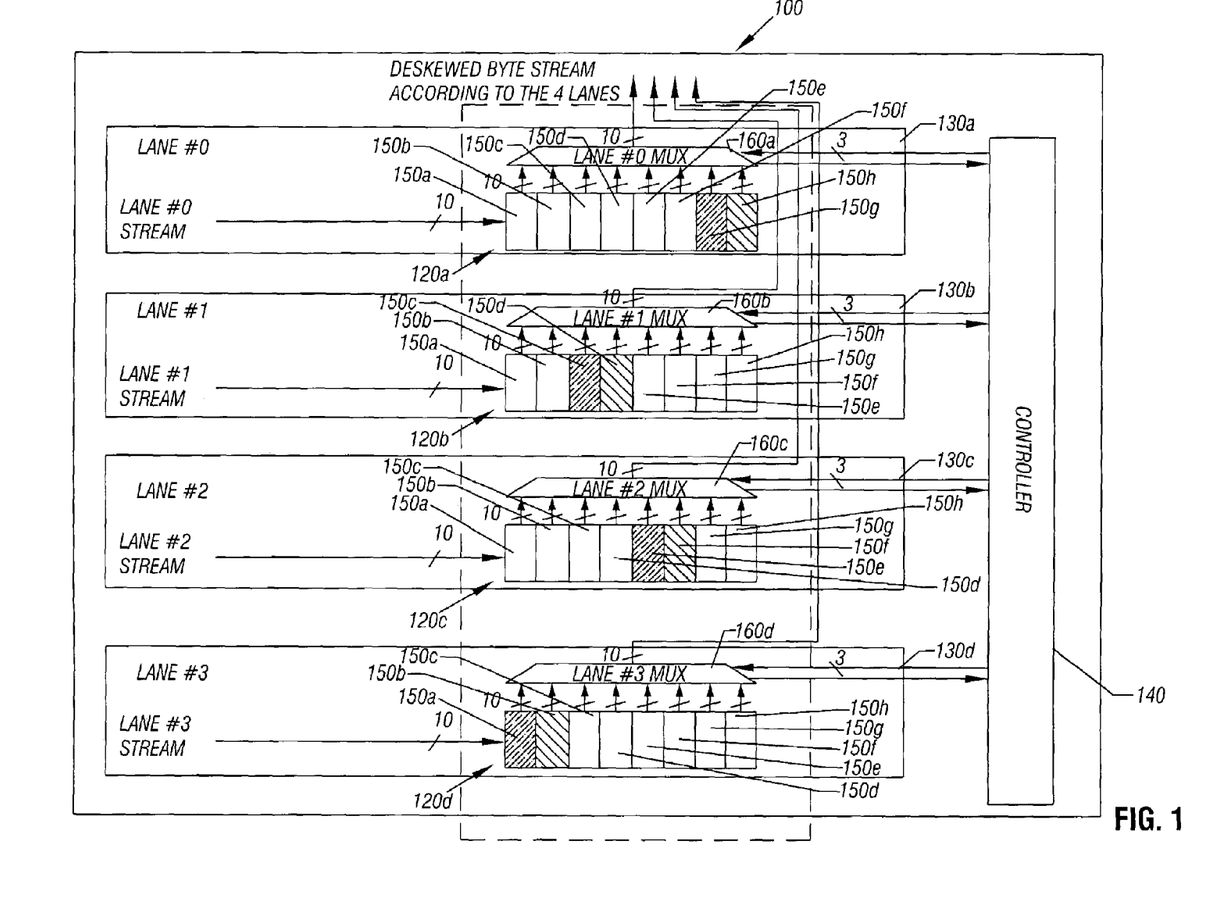
FIG. 1 is a block diagram of a de-skew mechanism according to an embodiment of the present invention.

Referring to FIG. 1, a de-skew mechanism 100 may be located/implemented in an Ethernet controller, an Infini-Band™ adaptor, an input/output ("I/O") processor, a memory controller hub ("MCH"), or an input/output controller hub ("ICH"), to give some examples. Data may flow through the de-skew mechanism 100 in lanes 130. Although data is always transmitted simultaneously through the lanes 130 of the de-skew mechanism 100, the data may be skewed in time upon delivery to the de-skew mechanism 100 from an internal or peripheral device (not shown). An internal device may be a sound card, graphics card, controller card, modem, or internal hard drive, for example. A peripheral device may be a printer, scanner, external hard drive, or a network-connected computer, for example.

A serial buffer 120 may be included within each lane 130 to align the data temporally before it is delivered, for example. The serial buffer 120 may include multiple elements 150 in order to facilitate reduction of lane-to-lane skew. An element may be defined as a portion of memory to store at least one symbol of data. For example, a serial buffer 120 that includes eight elements, as shown in FIG. 1, may be capable of storing eight symbols of data, with a predetermined number of bits of data per element, in some embodiments. In some embodiments, the number of elements 150 in the serial buffer 120 may exceed a maximum lane-to-lane skew.

Data generally flows through a serial buffer 120 from the receiving end element 150a to the delivering end element 150h. Data may proceed bit-by-bit through the serial buffer 120, advancing from one element 150 to the next. For example, an element 150 may store one symbol of data at a time as the data flows through the buffer 120. As the data passes through the buffer 120, data stored in one element 150 may advance to the next element 150 and may be replaced with other data.

Data may be delivered to an internal or peripheral device from an element 150 within the serial buffer 120, other than element 150h. In some embodiments, data may be delivered from any one of the elements 150 of a buffer 120. Data need not be delivered from the same element 150 of different buffers 120. For example, in one embodiment, data may be delivered from element 150h of serial buffer 120a, and data maybe delivered from element 150d of serial buffer 120b.

The de-skew mechanism 100 may further include a controller 140 to locate a symbol in the serial buffer 120. In some embodiments, the symbol may have a particular value or a value within a particular range. For example, the symbol may be a combination of bits. For instance, the symbol may be a component object model (COM) symbol to indicate the beginning of a program routine. In some embodiments, symbols in different buffers 120 may be located independently. In some embodiments, the controller 140 may locate a symbol by reading data that includes the symbol from the serial buffer 120. For instance, the controller 140 may be deemed to have located a symbol if the symbol is located in the data read from the buffer 120. In some embodiments, the controller 140 may be deemed to have located a symbol if a portion of the symbol is located in the data read from the buffer 120. For example, if a symbol may be identified by fewer than all of its bits, then it may be possible to locate the symbol by locating a portion of the symbol.

The location of the symbol is the element(s) 150 of the buffer 120 in which the symbol is stored. For example, the symbol in buffer 120a may be stored in element 150g of buffer 120a. The symbol in buffer 120b may be stored in element 150c of buffer 120b, for example. In some embodiments, the element 150 from which data may be delivered may be based on the location of the symbol in the serial buffer 120. For example, in some embodiments, the element 150 of a buffer 120 from which data may be delivered may be the next successive element 150 after the element(s) 150 in which the symbol is located. In some embodiments, the element 150 from which data may be delivered may be the same as the location of the symbol in the serial buffer 120.

The de-skew mechanism 100 may include a multiplexer 160 to extract data from a buffer 120. The controller 140 may determine that the data is to be delivered from a particular element 150 of the buffer 120. In some embodiments, the data to be delivered from the particular element 150 may include a series of data of a predetermined size that extends from the particular element 150 opposite the direction of data flow. The controller 140 may base its determination that the data is to be delivered from the particular element 150 on the location of the symbol in the serial buffer 120. For example, in some embodiments, the controller 140 may determine that data is to be delivered from the location of the symbol in the buffer. In some embodiments, the controller 140 may provide an addressing input to the multiplexer 160. The addressing input may specify the element 150 of the buffer 120 from which the data is to be extracted by the multiplexer 160.

The number of bits that may be stored in an element 150 of the buffers 120 may be represented by the variable B. The number of elements 150 in the serial buffer 120 may be represented by the variable E. In some embodiments, the controller 140 may determine that data is to be delivered from particular elements 150 of the buffers 120 in response to X bits of data proceeding through the buffers 120 after a symbol is located. The variable X may be represented by the following equation: $X=B*E$. In some embodiments, such a technique may ensure that all buffers 120 in the lanes 130 of the de-skew mechanism 100 have received a symbol before delivery of the data occurs. For example, receipt of a symbol in a buffer 120 may indicate that data is available for delivery in the buffer 120.

Figure 2:
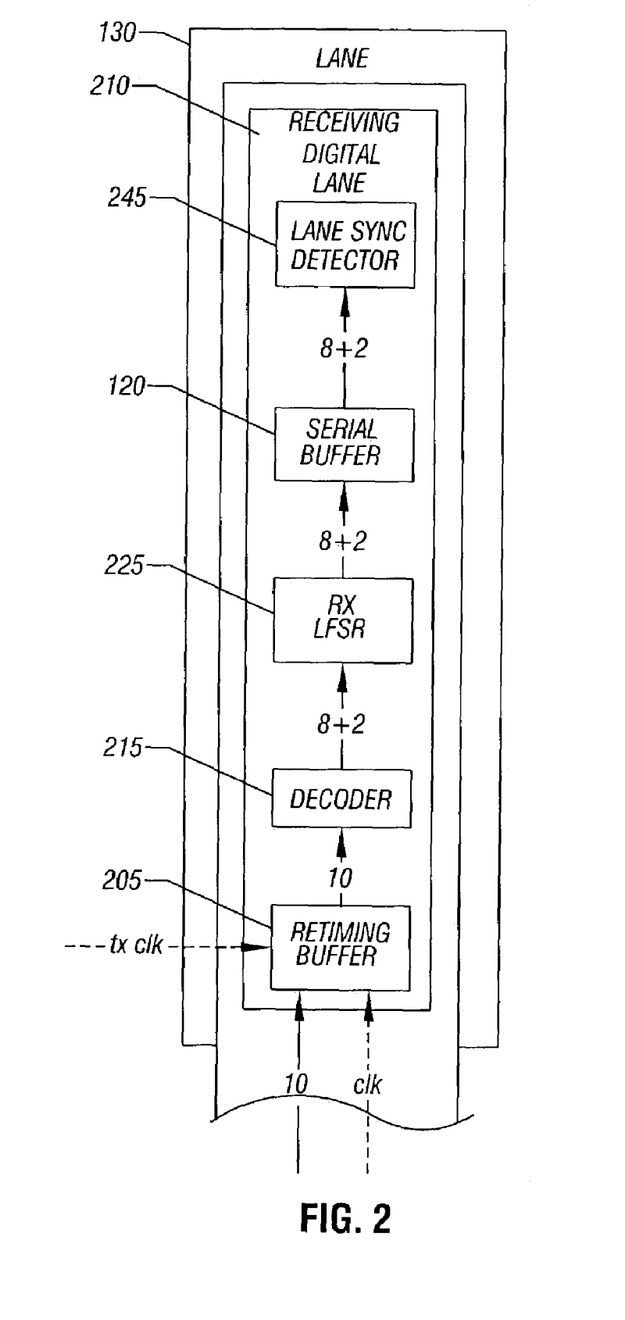
FIG. 2 is a block diagram of the digital portion of single lane according to an embodiment of the present invention.

Referring to FIG. 2, a lane 130 may include a receiving digital lane 210 to receive data into the lane 130 from an internal or peripheral device, for example. The data received by the receiving digital lane 210 may be in the form of a code to represent the data. The receiving digital lane 210 may include a retiming buffer 205, a decoder 215, a receiving linear feedback shift register ("RX LFSR") 225, a serial buffer 120, and a lane sync detector 245. The retiming buffer 205 may receive, data and synchronize the data with a clock. The clock may be a transmitting clock, for example. In some embodiments; the decoder 215 may convert a code that represents the data into a readable form to be de-skewed, for example. The RX LFSR 225 may manipulate the data upon receipt of a clock signal, for example. For instance, a bit of data may advance through the RX LFSR 225 to another bit storage location if the RX LFSR 225 receives a clock signal. The lane sync detector 245 may determine whether the data has been de-skewed in the receiving digital lane 210 before it is extracted by a multiplexer 160 (see FIG. 1), for example. For instance, the lane sync detector 245 may verify that the serial buffer 120 includes a symbol.

Figure 3:
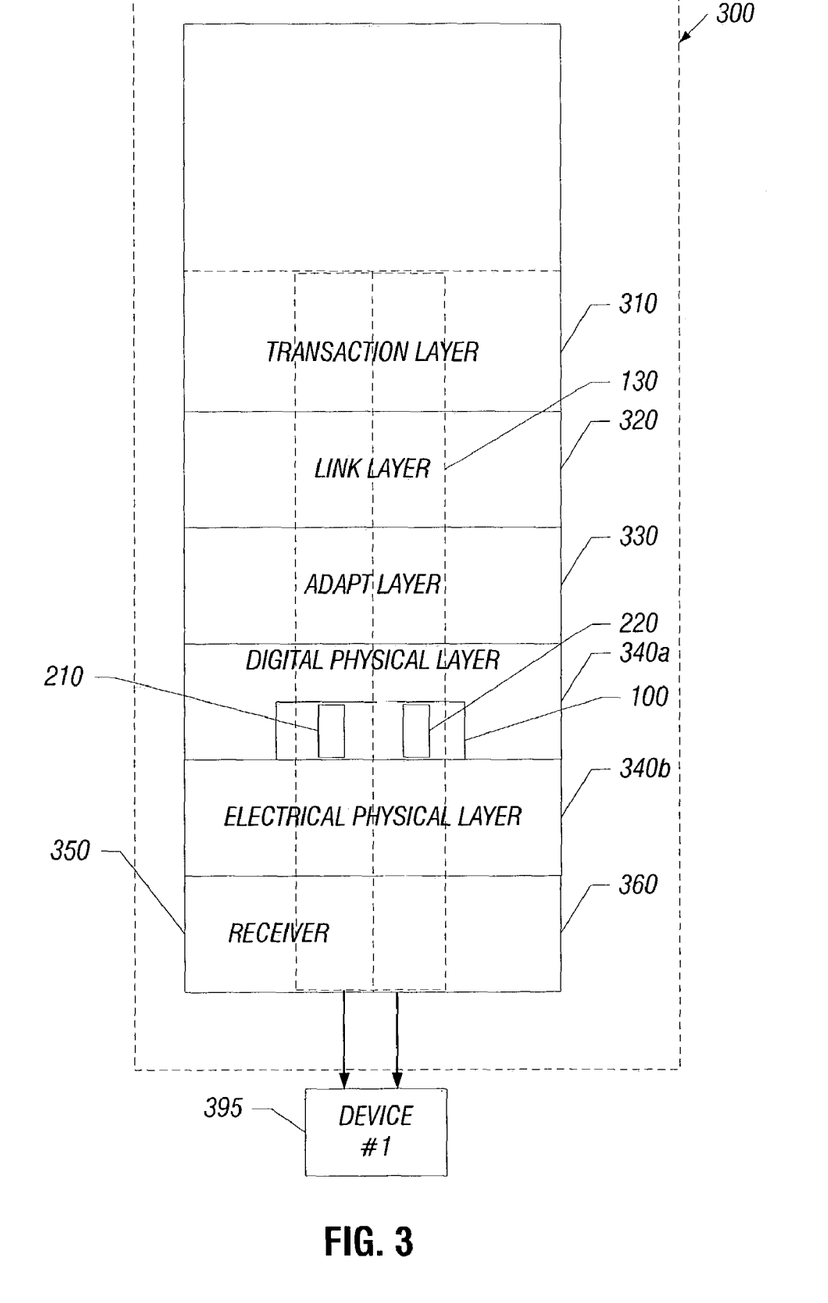
FIG. 3 is a block diagram of an interface according to an embodiment of the present invention.

Referring to FIG. 3, the de-skew mechanism 100, shown in FIG. 1, may be included in an interface 300 to de-skew data in lanes 130. In some embodiments, the de-skew mechanism 100 may be included in a digital physical layer 340a of the interface 300. For example, in some embodiments, an interface 300 may be a Peripheral Component Interconnect ("PCI") Express architecture, PCI-SIG PCI Express Base Specification Revision 1.0, published Jul. 22, 2002, also known as the Third Generation Input/Output ("3GIO") architecture. For example, in some embodiments, an interface 300 may be an InfiniBand™ architecture ("IBA"), InfiniBand™ Architecture Specification Release 1.0.a, published Jun. 19, 2001. In some embodiments, the interface 300 may manage or control the flow of data between devices 395. A device 395 may be a computer, processor, hard drive, printer, or modem, for example.

The interface 300 may include a transaction layer 310, a link layer 320, an adapt layer 330, the digital physical layer 340a, an electrical physical layer 340b, a receiver 350, and a transmitter 360. The transaction layer 310 may be responsible for assembly and disassembly of transaction layer packets ("TLPs"). TLPs may be used to communicate transactions, such as read and write transactions. In some embodiments, the transaction layer 310 may manage credit-based flow control of TLPs. If a request packet requires a response packet, the request transaction and the response transaction may be implemented as a split transaction, for example. In this example, a split transaction may mean that other transactions may occur between the request transaction and the response transaction.

In some embodiments, a request packet may have a unique identifier to enable a response packet to be directed to the request packet. For example, a format of the TLPs may support one or more forms of addressing. A form of addressing may depend on a type of transaction associated with a packet. The type of transaction may be memory, I/O, configuration, and/or message, for example. In some embodiments, the transaction layer may support four address spaces, which may include, for example, three PCI address spaces (e.g., memory, input/output ("I/O"), and configuration) and a message space. The message space may be used to support prior sideband signals, for example, such as interrupts and power-management requests, as in-band message transactions. In some embodiments, the message transactions may reduce or eliminate sideband signals generally used in a platform implementation.

The link layer 320 may serve as an intermediate layer between the transaction layer 310 and the physical layers 340. The link layer 320 may be responsible for management and data integrity, which may include error detection and/or error correction, for example.

The adapt layer 330 may forward a signal from the link layer 320 to the physical layers 340, and/or vice versa. In some embodiments, the link layer 320 may operate at a first frequency, and the physical layers 340 may operate at a second frequency. The adapt layer 330 may convert the signals from the first frequency to the second frequency, and/or vice versa.

The digital physical layer 340a and/or the electrical physical layer 340b may include interface circuitry, such as a driver buffer, an input buffer, a parallel-to-serial converter, a serial-to-parallel converter, a phase-locked loop ("PLL"), or impedance matching circuitry. In some embodiments, the digital physical layer 340a may facilitate initialization and maintenance of the interface 300. In some embodiments, the digital physical layer 340a and/or the electrical physical layer 340b may exchange information with the link layer 320 in an implementation-specific format, for example. The de-skew mechanism 100 (see FIG. 1) may be included in the digital physical layer 340a, for example, to exchange information with the link layer 320. The de-skew mechanism may be used on the receive stream. In the transmit path no de-skew may be needed. The de-skew mechanism 100 may receive information through the link layer 320 from a device 395 via lanes 130, for example. In some embodiments, the physical layers 340 may be responsible for converting information received from the link layer 320 into a serialized format. In some embodiments, the physical layers 340 may transmit the converted information through the lanes 130 to a device 395 at a frequency compatible with the device 395. For example, the multiplexer 160 (see FIG. 1) may serialize the information the de-skew mechanism 100 receives from the link layer 320. The serialized information may be transmitted back through the link layer 320 to a device 395.

In some embodiments, a receiver 350 may receive a signal from a device 395, for example, and forward it to the digital physical layer 340a and/or the electrical physical layer 340b. In some embodiments, a transmitter 360 may transmit a signal received from the digital physical layer 340a and/or the electrical physical layer 340b to a device 395, for example.

Figure 4:
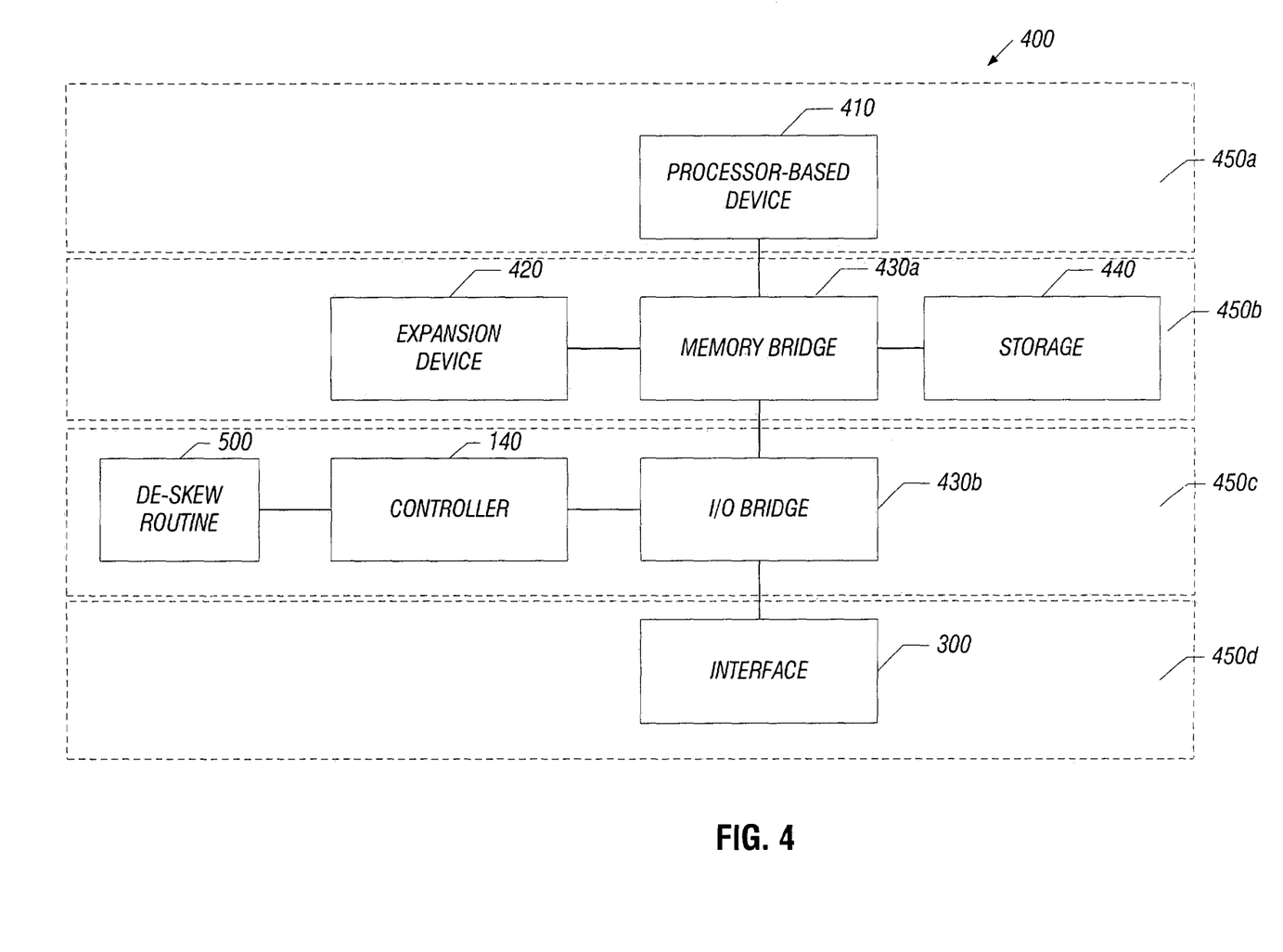
FIG. 4 is a block diagram of a system according to an embodiment of the present invention.

Referring to FIG. 4, a system 400 may include a processor-based device 410 to process information received from an interface 300 (see FIG. 3), for example. In some embodiments, the processor-based device 410 may be a microprocessor or a computer. A storage 440 may be coupled to the processor-based device 410 to store information received from the processor-based device 410, for example. The storage 440 may be a read-only memory ("ROM") or a random access memory ("RAM"), for example.

Coupled may be defined to mean directly or indirectly coupled. For example, in some embodiments, the storage 440 may be directly coupled to the processor-based device 410 because no other device is coupled between the storage 440 and the processor-based device 410. In some embodiments, the bridge 430 may be indirectly coupled to the processor-based device 410 because one or more devices are coupled between the storage 440 and the processor-based device 410. For instance, the storage 440 may be coupled to another device, and the other device may be coupled to the processor-based device 410. In some embodiments, the other device may be a bridge 430, for example.

The system 400 may include at least one bridge 430 to direct data within the system 400, for example. In some embodiments, the bridge 430 may direct data received from the processor-based device 410 to another device, such as a storage 440, an expansion device 420, a controller 140, or an interface 300, to give some examples. In some embodiments, the bridge 430 may be coupled to the processor-based device 410.

A bridge 430 may be a memory bridge 430a or an I/O bridge 430b, to give some examples. In some embodiments, a memory bridge 430a may be coupled to the processor-based device 410 to direct data within the system 400. In some embodiments, the system 400 may be partitioned into segments 450 in order to facilitate rapid delivery of data from one device to another. A device may be a processor-based, device 410, an expansion device 420, a storage 440, or a controller 140, to give some examples. In some embodiments, the memory bridge 430a may attempt to keep data that is to be delivered to a particular segment of the system 400 confined within that particular segment. For example, data that is to be delivered to a memory may be confined within segment 450b. For instance, data that is to be delivered to a device outside the system 400 may be confined within segment 450d.

In some embodiments, an expansion device 420, such as a graphics card, may be coupled to the memory bridge 430a. In some embodiments, the storage 440 may be coupled to the memory bridge 430a. In some embodiments, an I/O bridge 430b may be coupled to the processor-based device 410 to direct data within the system 400. For example, the I/O bridge 430b may direct data to the interface 300.

Figure 5:
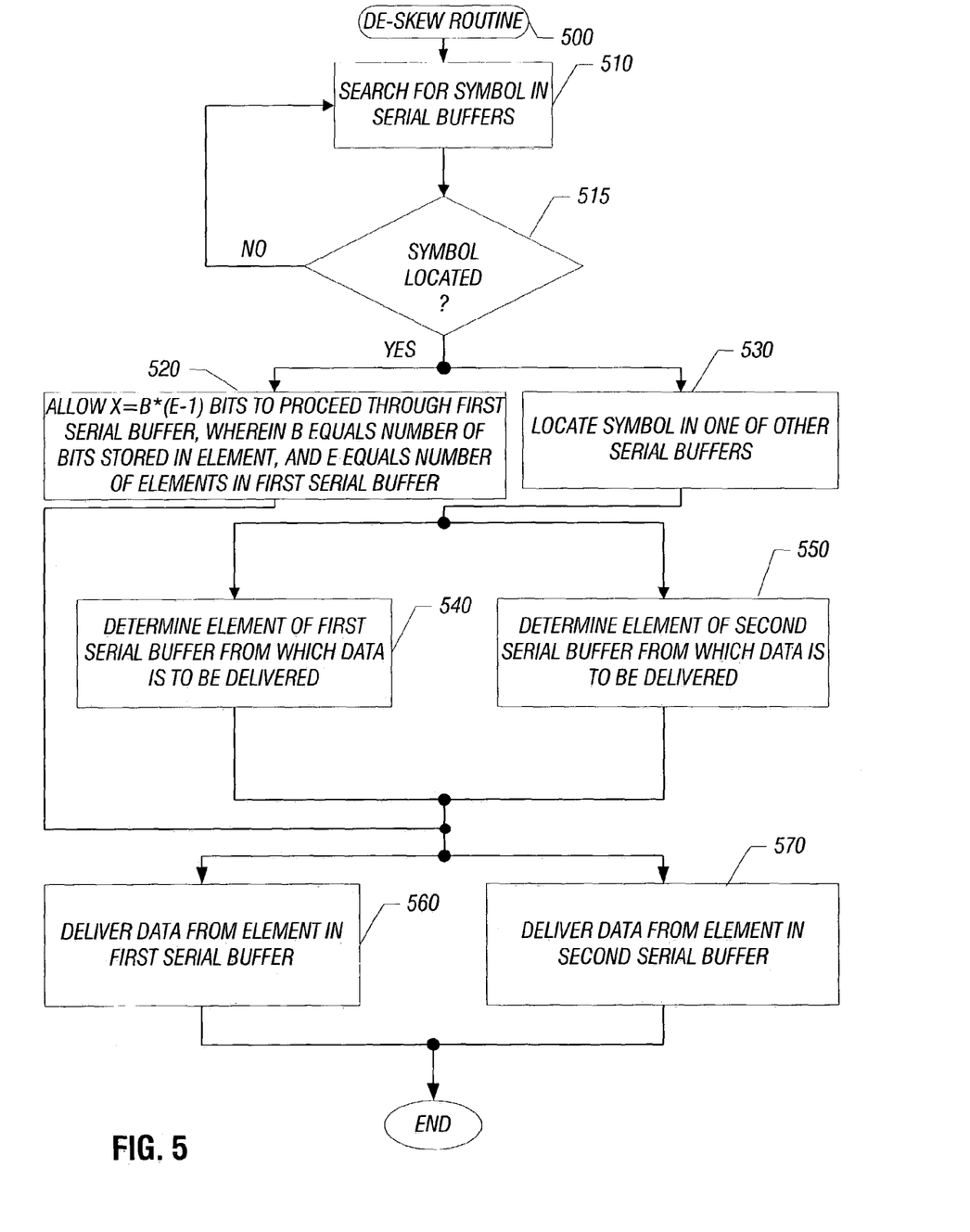
FIG. 5 is a flow chart for software that may be utilized by the apparatus shown in FIG. 1 according to an embodiment of the present invention.

Referring to FIG. 5, a de-skew routine 500 may be stored in a controller 140 (see FIG. 4), for example. In some embodiments, the de-skew routine 500 may be stored in a storage 440 (see FIG. 4). The de-skew routine 500 may include searching the serial buffers 120 (see FIG. 1) for a symbol as indicated in block 510. For example, as data is received by the buffers 120, the data may be searched bit-by-bit or block-by-block. A block of information may be any number of bits of information. Assuming that the symbol is located in a serial buffer 120a, as determined at diamond 515. For example, if the number of elements in the serial-buffer 120a exceeds the maximum lane-to-lane skew, allowing X bits to proceed through the serial buffer 120a may ensure that symbols are located in all remaining serial buffers 120b–120d before data is delivered from the buffers 120. For instance, the symbol may be located in a serial buffer 120b before data is delivered from the serial buffers 120, as indicated at block 530. Accordingly, the effects of lane-to-lane skew may be eliminated, in some embodiments, upon delivery of the data from the buffers 120.

An element of the serial buffer 120a from which data is to be delivered may be determined at blocks 540. In some embodiments, an element of the serial buffer 120b from which data is to be delivered may be determined at blocks 550. For example, in some embodiments, an element of a serial buffer 120 from which data is to be delivered may be the same as a location of the symbol in the serial buffer 120. In some embodiments, the element from which data is to be delivered may be any element in the buffer 120 and need not necessarily depend on the location of the symbol. Data may be delivered at block 560 from the element of the serial buffer 120a, as determined at block 540. Data may be delivered at block 570 from the element of the serial buffer 120b, as determined at block 550.

Delivering data from different elements in different buffers 120 has many advantages. For instance, in some embodiments, the gap in data flow that often occurs during operation of de-skew mechanisms may be eliminated. In some embodiments, this technique may easily be used with other de-skewing techniques. In some embodiments, a system may be able to handle larger lane-to-lane skew and/or a greater number of lanes 130 (see FIG. 1).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
delivering first data from a first position in a first serial buffer having a receiving end to receive the first data and a delivering end opposite the receiving end; and
delivering second data from a second position in a second serial buffer having a receiving end to receive the second data and a delivering end opposite the receiving end, and the first position relative to the delivering end of the first serial buffer is different than the second position relative to the delivering end of the second serial buffer.

2. The method of claim 1 including delivering the first data from the first position in the first serial buffer having a number of elements that exceeds a maximum lane-to-lane skew.

3. The method of claim 2 including delivering the first data from the first position in the first serial buffer having eight elements.

4. The method of claim 1 further including locating a first element in the first serial buffer and thereafter allowing X=B*E bits to proceed through the first serial buffer before delivering the first data, wherein B equals a number of bits capable of being stored in an element, and E equals a number of elements in the first serial buffer.

5. The method of claim 1 further including determining a location of a first element in the first serial buffer, basing the first position on the location of the first element in the first serial buffer, determining a location of a second element in the second serial buffer, and basing the second position on the location of the second element in the second serial buffer.

6. The method of claim 1 further including locating a first element in the first serial buffer, and locating a second element in the second serial buffer, independently.

7. An article comprising a medium storing instructions that, if executed, enable a processor-based system to:
deliver first data from a first position in a first serial buffer having a receiving end to receive the first data and a delivering end opposite the receiving end; and
deliver second data from a second position in a second serial buffer having a receiving end to receive the second data and a delivering end opposite the receiving end, and the first position relative to the delivering end of the first serial buffer is different than the second position relative to the delivering end of the second serial buffer.

8. The article of claim 7 storing instructions that, if executed, enable a processor-based system to deliver the first data from the first position in the first serial buffer having a number of elements that exceeds a maximum lane-to-lane skew.

9. The article of claim 8 storing instructions that, if executed, enable a processor-based system to deliver the first data from the first position in the first serial buffer having eight elements.

10. The article of claim 7 further storing instructions that, if executed, enable a processor-based system to locate a first element in the first serial buffer and thereafter allow X=B*E bits to proceed through the first serial buffer before delivering the first data, wherein B equals a number of bits capable of being stored in an element, and E equals a number of elements in the first serial buffer.

11. The article of claim 7 further storing instructions that, if executed, enable a processor-based system to:
determine a location of a first element in the first serial buffer; and
determine a location of a second element in the second serial buffer, and the first position is based on the location of the first element in the first serial buffer, and the second position is based on the location of the second element in the second serial buffer.

12. The article of claim 7 further storing instructions that, if executed, enable a processor-based system to:
locate a first element in the first serial buffer; and
locate a second element in the second serial buffer, wherein locating the first element and locating the second element are capable of being performed independently.

13. An apparatus comprising:
a first serial buffer to receive first data at a receiving end of the first serial buffer, and the first serial buffer includes a delivering end, opposite the receiving end, and a first position;
a second serial buffer to receive second data at a receiving end of the second serial buffer, and the second serial buffer includes a delivering end, opposite the receiving end, and a second position; and
a controller to determine that the first data is to be delivered from the first position and that the second data is to be delivered from the second position, and the first position relative to the delivering end of the first serial buffer is different than the second position relative to the delivering end of the second serial buffer.

14. The apparatus of claim 13, wherein the first serial buffer includes a number of elements, and the number of elements exceeds a maximum lane-to-lane skew.

15. The apparatus of claim 14, wherein the number of elements is eight.

16. The apparatus of claim 13 including the controller to locate a first element in the first serial buffer and to allow X=B*E bits to proceed through the first serial buffer after the first element is located before delivering the first data, wherein B equals a number of bits capable of being stored in an element, and E equals a number of elements in the first serial buffer.

17. The apparatus of claim 13 including the controller to determine a location of a first element in the first serial buffer and to determine a location of a second element in the second serial buffer, and the first position is based on the location of the first element in the first serial buffer, and the second position is based on the location of the second element in the second serial buffer.

18. The apparatus of claim 13 including the controller to locate a first element in the first serial buffer and to locate a second element in the second serial buffer, and locating the first element and locating the second element are capable of being performed independently.

19. The apparatus of claim 13, wherein the apparatus is an Ethernet controller.

20. The apparatus of claim 13, wherein the apparatus is an InfiniBand™ adaptor.

21. A system comprising:
a processor-based device;
a bridge to direct data received from the processor-based device; and
a storage coupled to the processor-based device storing instructions that, if executed, enable the processor-based device to:
deliver first data from a first position in a first serial buffer having a receiving end to receive the first data and a delivering end opposite the receiving end, and
deliver second data from a second position in a second serial buffer having a receiving end to receive the second data and a delivering end opposite the receiving end, and the first position relative to the delivering end of the first serial buffer is different than the second position relative to the delivering end of the second serial buffer.

22. The system of claim 21 storing instructions that, if executed, enable the processor-based device to deliver the first data from the first position in the first serial buffer having a number of elements that exceeds a maximum lane-to-lane skew.

23. The system of claim 22 storing instructions that, if executed, enable the processor-based device to deliver the first data from the first position in the first serial buffer having eight elements.

24. The system of claim 21 further storing instructions that, if executed, enable the processor-based device to locate a first element in the first serial buffer and thereafter allow X=B*E bits to proceed through the first serial buffer before delivering the first data, wherein B equals a number of bits capable of being stored in an element, and E equals a number of elements in the first serial buffer.

25. The system of claim 21 further storing instructions that, if executed, enable the processor-based device to:
determine a location of a first element in the first serial buffer; and determine a location of a second element in the second serial buffer, and the first position is based on the location of the first element in the first serial buffer, and the second position is based on the location of the second element in the second serial buffer.

26. The system of claim 21 further storing instructions that, if executed, enable the processor-based device to:

locate a first element in the first serial buffer; and
locate a second element in the second serial buffer, wherein locating the first element and locating the second element are capable of being performed independently.

* * * * *